United States Patent [19]
Hansen

[11] 3,731,637
[45] May 8, 1973

[54] PUSHER DEVICE
[75] Inventor: Niels S. Hansen, Fort Wayne, Ind.
[73] Assignee: Foundation and Bridge Corp., Fort Wayne, Ind.
[22] Filed: June 3, 1971
[21] Appl. No.: 149,463

[52] U.S. Cl. ............................. 104/172 B, 198/171
[51] Int. Cl. ............................................. B65g 19/00
[58] Field of Search .................... 104/172 B; 198/171

[56] References Cited

UNITED STATES PATENTS

| | | | |
|---|---|---|---|
| 3,408,951 | 11/1968 | Heinicke | 104/172 B |
| 3,455,250 | 7/1969 | Enning | 104/172 B |
| 3,596,606 | 8/1971 | Smith | 104/172 B |

Primary Examiner—Gerald M. Forlenza
Assistant Examiner—George F. Abraham
Attorney—Jeffers and Rickert

[57] ABSTRACT

The specification discloses a pusher device for use with the conveyor chain of a car washing installation, or the like, in which the pusher device includes a bracket adapted for manual engagement with and disengagement from the chain and having support rollers rolling on the vehicle wheel support surface and pusher rollers rollingly engageable with a wheel of a vehicle passing through the installation.

1 Claim, 6 Drawing Figures

PATENTED MAY 8 1973 3,731,637

INVENTOR
NIELS S. HANSEN
by Jeffers & Rickert
Attorneys

INVENTOR
NIELS S. HANSEN
by Jeffers & Rickert
Attorneys

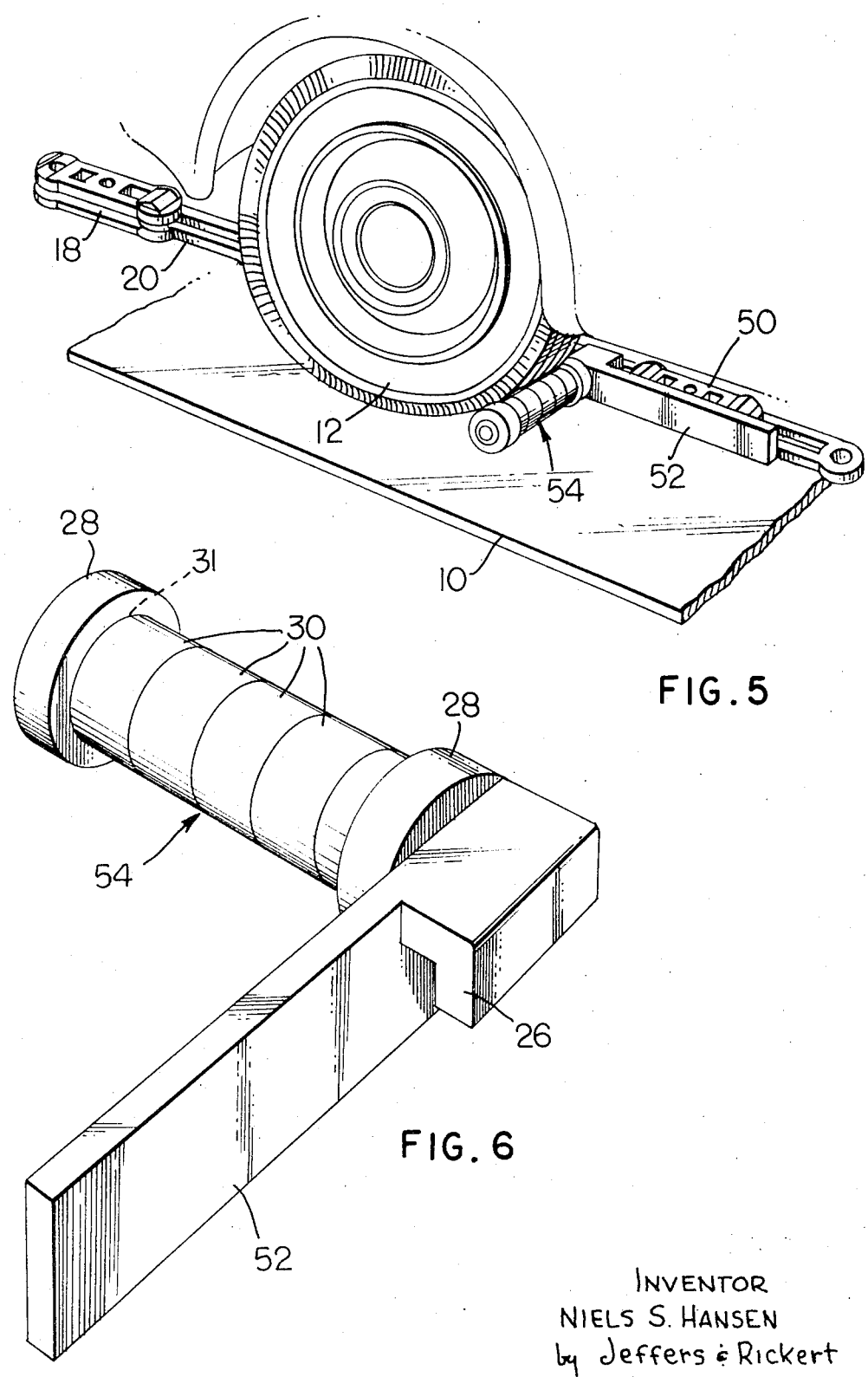

PUSHER DEVICE

The present invention relates to a pusher device, especially for use in a car washing installation or the like for pushing vehicles through the installation.

Car washing installations usually comprise guide means for guiding a vehicle along a predetermined path through the installation in the advancing direction while a pusher arrangement is provided for engaging at least one wheel of the vehicle to push it through the installation.

Such pusher devices are generally in the form of an instrumentality to engage a vehicle wheel, usually near the bottom thereof, and connected to a flexible drive element, such as a chain, which runs in an endless path with one reach extending through the installation adjacent one side of the vehicle so that the pushing instrumentality is engageable with a vehicle wheel.

The present invention is particularly concerned with an improved pusher device for use with a conveyor chain employed in a car washing installation, or the like, of the nature referred to.

A particular object of the present invention is the provision of a pusher device of an improved construction which has long life and operates efficiently.

Another object is the provision of a pusher device for pushing vehicles through a car wash, or the like, which is readily engageable with or detachable from the conveyor chain so as to be readily adjustable along the length of the conveyor chain.

Still another object is the provision of a pusher device which can be placed on or removed from the conveyor chain while the chain is in motion thereby limiting lost time for changing the position of the pusher device on the chain or for repair or adjustment of the pusher device.

Another object is the provision of a pusher device of the nature referred to which is extremely simple and inexpensive to manufacture.

Still another object of the invention is the provision of a pusher device of the nature referred to which is usable, not only with new installations, but with existing installations, as well.

These and other objects and advantages of the present invention will become more apparent upon reference to the following detailed specification taken in connection with the accompanying drawings in which:

FIG. 5 is a view like FIG. 1 but showing the pusher device on the opposite side of the chain; and FIG. 6 is a view showing the pusher device of FIG. 5 in perspective.

BRIEF SUMMARY OF THE INVENTION:

The pusher device of the present invention comprises a bar or arm part adapted for extending longitudinally a substantial distance along the side of a conveyor chain between the chain and the wheel of the vehicle which is adjacent to the chain. Near the leading end, the arm has, on one side, a bracket having a downwardly depending leg so the arm can be connected with and removed from the chain from above in a simple manner.

Extending laterally from the arm, and preferably near the leading end, is a shaft, and mounted on the shaft in spaced relation are two larger rollers which roll on the surface on which the wheel rests, while between the larger rollers are smaller rollers which rollingly engage the periphery of the vehicle wheel.

The bracket is preferably welded to the arm and the shaft is also welded to the arm and the rollers are retained on the shaft by a detachable retaining means, such as a screw, cutter pin or like means so that the pusher device is extremely simple and inexpensive to manufacture and to maintain and can readily be adjusted along the conveyor chain to any desired position, and can quickly be removed and replaced with another should it be necessary to replace any of the rollers thereon or if a pusher device should become defective for any other reason.

Figure 1:
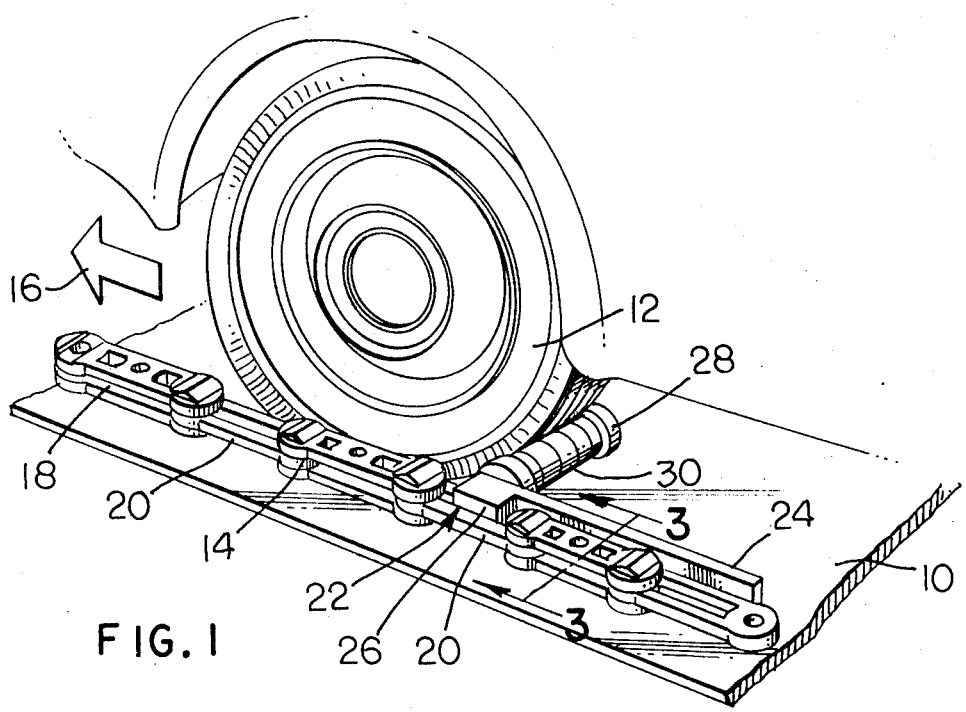
FIG. 1 is a fragmentary perspective view showing a portion of an installation in which a pusher device according to the present invention is incorporated.

DETAILED DESCRIPTION OF THE INVENTION:

Referring to the drawings somewhat more in detail, FIG. 1 is a fragmentary perspective view showing a portion of an installation through which a vehicle is to be advanced. The installation might, for example, be a car washing installation.

The installation of FIG. 1 comprises a support surface 10 on which wheel 12 of the vehicle being advanced through the installation rests. Adjacent wheel 12 is one reach 14 of a conveyor chain which runs in a horizontal plane with the reach adjacent wheel 12 moving in the direction indicated by arrow 16. The chain is made up of links 18 which open laterally to receive sprocket teeth and intervening links 20 which may be open in the vertical direction. The links are pivotally interconnected at the ends in a conventional manner.

The chain may be supported and guided in any conventional manner and is exposed on the side facing wheel 12. The chain may be on either the inside or the outside of wheel 12, depending on the manner in which the installation is constructed. The pusher device according to the present invention is generally indicated at 22 in FIG. 1 and will be seen to comprise an elongated arm 24 extending along the chain on the wheel side thereof and at the leading end having a bracket 26 secured thereto that engages over at least one side of a link 20.

Extending laterally from the leading end of bar portion 24 across the surface 10 on which wheel 12 rests is a shaft having mounted thereon near the ends a pair of end rollers 28 that rest on surface 10 and therebetween rollers 30 which rollingly engage the periphery of wheel 12. Rollers 28 may be, as shown, larger than rollers 30 but all of the rollers could be of the same size.

Figure 2:
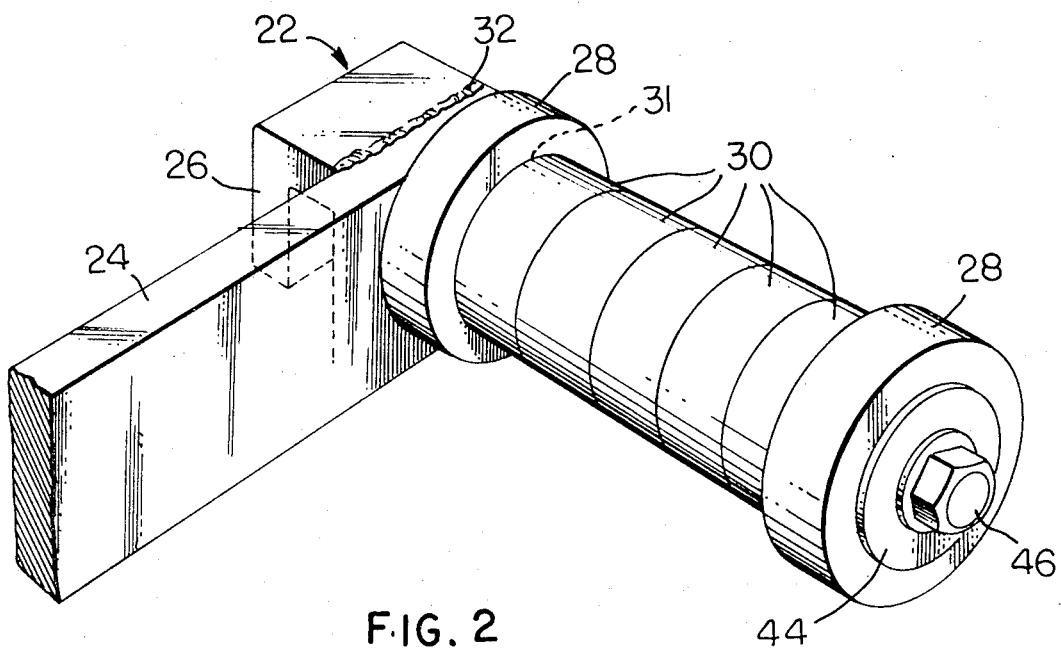
FIG. 2 is a perspective view showing the roller end of the pushing device.
Figure 3:
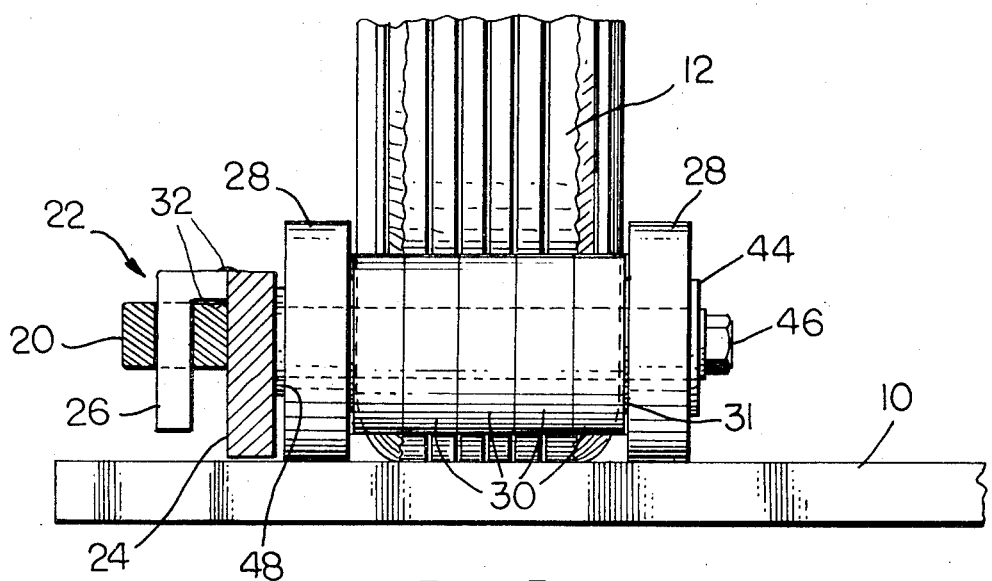
FIG. 3 is a sectional view indicated by line III—III on FIG. 1.
Figure 4:
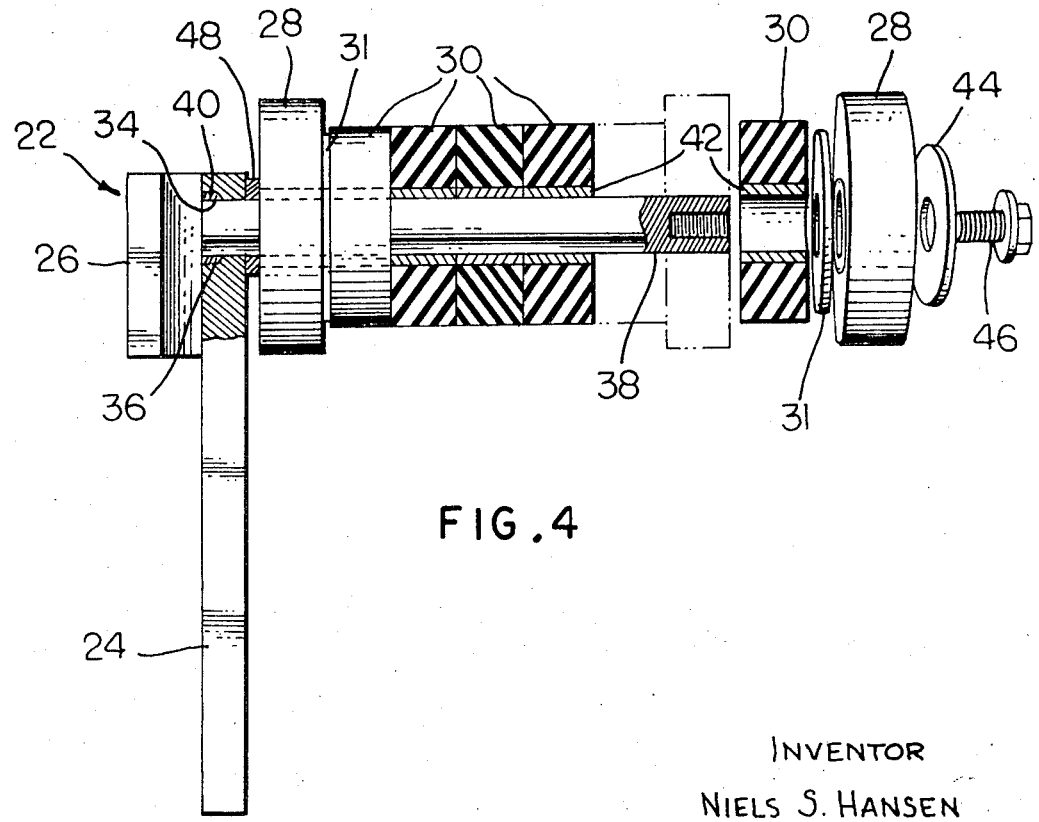
FIG. 4 is a view partly in section showing more in detail the mounting of the rollers on the shaft of the pushing device.

As will be seen in FIGS. 2 to 4, the bracket 26 may comprise an L-shaped member having a shorter leg fixed to the upper edge of bar 24 as by welding 32 and having a dependent leg adapted to engage over the top of a link 20, or over one side rail of the link 20 if the link is formed with parallel side rails.

It will be appreciated that the bracket 26 rather loosely engages the chain so that the trailing end of bar 24 can slide on surface 10 and thereby support the bar 24 substantial horizontal. Bar 24 extends longitudinally of the chain a substantial distance, for example, a distance of about two links or more thereof and is thus capable of transmitting loads imposed thereon by wheel 12 to the side of the chain.

As has been mentioned, the chain is usually supported against lateral movement away from wheel 12 so that the elongated bar 24 forms an efficient way of supporting the pushing loads imposed on the pusher device and holding shaft 38 perpendicular to the chain.

In the region of bracket 26, the arm 24 has a hole 34 formed therein which is counterbored as at 36 to receive support shaft 38 which is fixedly secured to bar 24 by welding 40.

The aforementioned rollers 28 and 30 all may be formed of rubber-like material or other castable material, or merely the rollers 30 may be formed of rubber-like material or other castable material, and each thereof is preferably provided with an internal busing 42 rotatably supporting the respective roller on shaft 38.

The assembled rollers are replaceably retained on shaft 28 by a retaining washer 44 which is held against the end of the shaft by a retaining screw 46 threaded into the end of the shaft or by means of a cotter pin or other locking devices. A washer 48 on the shaft at the arm end thereof may be provided to prevent the adjacent roller 28 from rubbing against the side of arm 24.

Further washers, as shown at 31, can be placed between end rollers 28 and the rollers 30 adjacent thereto to eliminate wear.

As will be seen in FIG. 3, rollers 28 are disposed laterally outside the limits of wheel 12 so that they rollingly engage only the wheel supporting surface 10, whereas the smaller rollers 30 are disposed within the range of the wheel and at least some thereof rollingly engage only the periphery of the wheel.

FIGS. 5 and 6 are views similar to FIGS. 1 and 2 but show that the chain, indicated at 50, can be disposed inside wheel 12 with the pusher device mounted on the chain so as to extend outwardly therefrom. In the installation according to FIG. 1, the chain loop would lay outside the vehicle, whereas in the arrangement of FIG. 5, the chain loop would lie inside the vehicle so that the pusher device would not interfere with the movement of the chain around the sprockets and idlers which it engages.

In FIGS. 5 and 6, the bracket part 52 of the pusher device is the mirror image of the corresponding part in FIGS. 1 and 2, and the shaft and rollers generally indicated at 54 are mounted on the bracket in the same manner directly opposite the downward opening pocket portion which engages over one side of a link of the chain.

The arrangement of FIGS. 5 and 6 operates in exactly the same manner as the previously described modification, except that the pusher device is inverted.

The arrangement provided by the present invention is relatively inexpensive and is easily fabricated and can be mounted on and removed from the conveyor chain during continued movement of the chain.

Thus, the pusher devices, whether supported inside or outside the wheel, can be adjusted to desired positions along the chain to accommodate for different vehicle sizes and different operating conditions, and each can readily be removed from the chain and replaced by another in case it becomes necessary to recondition a pusher device for any reason, such as deterioration of the rollers or the like.

Modifications may be made within the purview of the appended claims.

What is claimed is:

1. A pusher device, especially for pushing a wheeled vehicle through a car wash or the like having an endless conveyor chain made up of pivotally interconnected links with at least some of the links of said chain open in the vertical direction and have spaced side members and running in a horizontal plane and adjacent a surface on which a vehicle wheel adjacent the chain rests, said device comprising, an arm adapted to be disposed on one side of the chain, said arm extending longitudinally of the chain a distance greater than the length of a link or the chain, an L-shaped bracket connected to the leading end of said arm forming a downwardly opening U-shaped pocket, said bracket adapted to engage over the top of a link of the chain so that said pusher device can be placed on and removed from the chain during continued movement thereof, a shaft fixed to said arm adjacent said bracket and extending horizontally therefrom above the surface, first roller means on said shaft rollingly engaging the surface and outside the lateral range of the vehicle wheel, and second roller means on the shaft adapted to rollingly engage the periphery of the vehicle wheel and spaced from the surface whereby said first roller means roll on the surface and said second roller means are adapted to roll on the vehicle wheel.

* * * * *